(12) United States Patent
Raghunath

(10) Patent No.: US 12,563,010 B2
(45) Date of Patent: Feb. 24, 2026

(54) PROBABILISTIC WILDCARD-BASED DNS RESOLUTION

(71) Applicant: Salesforce, Inc., San Francisco, CA (US)

(72) Inventor: Satish Raghunath, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/395,214

(22) Filed: Dec. 22, 2023

(65) Prior Publication Data

US 2025/0211563 A1 Jun. 26, 2025

(51) Int. Cl.
H04L 41/22 (2022.01)
H04L 61/4511 (2022.01)
H04L 101/345 (2022.01)

(52) U.S. Cl.
CPC .......... H04L 61/4511 (2022.05); H04L 41/22 (2013.01); H04L 2101/345 (2022.05)

(58) Field of Classification Search
CPC . H04L 61/4511; H04L 61/59; H04L 63/0245; H04L 51/212; H04L 41/22; H04L 2101/345
USPC ....................................................... 709/219
See application file for complete search history.

(56) References Cited

U.S. PATENT DOCUMENTS

| | | | |
|---|---|---|---|
| 10,205,634 B2 | 2/2019 | Gal et al. | |
| 10,405,208 B2 | 9/2019 | Ganapathi et al. | |
| 10,448,267 B2 | 10/2019 | Ganapathi et al. | |
| 10,454,803 B2 | 10/2019 | Gal et al. | |
| 10,548,034 B2 | 1/2020 | Ganapathi et al. | |
| 10,567,332 B2 | 2/2020 | Gal et al. | |
| 10,609,119 B2 | 3/2020 | Ganapathi et al. | |
| 10,778,522 B2 | 9/2020 | Tavridis et al. | |
| 10,791,035 B2 | 9/2020 | Ganapathi et al. | |
| 10,795,954 B2 | 10/2020 | Gal et al. | |

(Continued)

OTHER PUBLICATIONS

R. van Rijswijk-Deij, G. Rijnders, M. Bomhoff and L. Allodi, "Privacy-Conscious Threat Intelligence Using DNSBLoom," 2019 IFIP/IEEE Symposium on Integrated Network and Service Management (IM), Arlington, VA, USA, 2019, pp. 98-106. (Year: 2019).*

(Continued)

*Primary Examiner* — Messeret F Gebre
(74) *Attorney, Agent, or Firm* — Nicholson De Vos Webster & Elliott LLP

(57) ABSTRACT

Implementations for probabilistic wildcard-based DNS resolution are described. A request to validate a first subdomain is received from a domain name system (DNS) service attempting to resolve a DNS request that identifies the first subdomain. A validation outcome that indicates a guess regarding validity of the first subdomain may be determined based on a probabilistic data structure representing a set of valid subdomains. The validation outcome may be sent to the DNS service to cause the DNS service to resolve the first subdomain based on the validation outcome. In the case of the validation outcome indicating a guess of the first subdomain being valid, the first subdomain is caused to be resolved to a first common subdomain. In the case of the validation outcome indicating a guess of the first subdomain being invalid, the first subdomain is caused to be resolved to a second common subdomain.

21 Claims, 4 Drawing Sheets

(56) References Cited

U.S. PATENT DOCUMENTS

| | | | |
|---|---|---|---|
| 10,944,631 | B1 | 3/2021 | Ganapathi et al. |
| 11,050,706 | B2 | 6/2021 | Gal et al. |
| 11,076,023 | B1 | 7/2021 | Ganapathi et al. |
| 11,233,704 | B2 | 1/2022 | Ganapathi et al. |
| 11,271,840 | B2 | 3/2022 | Ganapathi et al. |
| 11,411,801 | B2 | 8/2022 | Gal et al. |
| 2009/0074008 | A1* | 3/2009 | Sargent ................. H04L 47/193 |
| | | | 370/469 |
| 2019/0052597 | A1 | 2/2019 | Raghunath et al. |
| 2019/0138362 | A1 | 5/2019 | Ganapathi et al. |
| 2020/0204581 | A1* | 6/2020 | Manadhata ......... H04L 61/4511 |
| 2020/0351244 | A1* | 11/2020 | Moore ................... H04L 63/20 |

OTHER PUBLICATIONS

A. Garba, Z. Chen, Z. Guan and G. Srivastava, "LightLedger: A Novel Blockchain-Based Domain Certificate Authentication and Validation Scheme," in IEEE Transactions on Network Science and Engineering, vol. 8, No. 2, pp. 1698-1710, Apr. 1-Jun. 2021, doi: 10.1109/TNSE.2021.3069128. keywords: (Year: 2021).*
Khan, F., Cuckoo vs Bloom Filter, Journal, Sep. 28, 2018, Techlog, Medium, San Francisco, California, USA, 13 pages, Downloaded Dec. 21, 2023, https://medium.com/techlog/cuckoo-filter-vs-bloom-filter-from-a-gophers-perspective-94d5e6c53299#:~:text=Cuckoo%20filters%20improve%20upon%20the,a%20compact%20cuckoo%20hash%20table.

* cited by examiner

FIG. 2

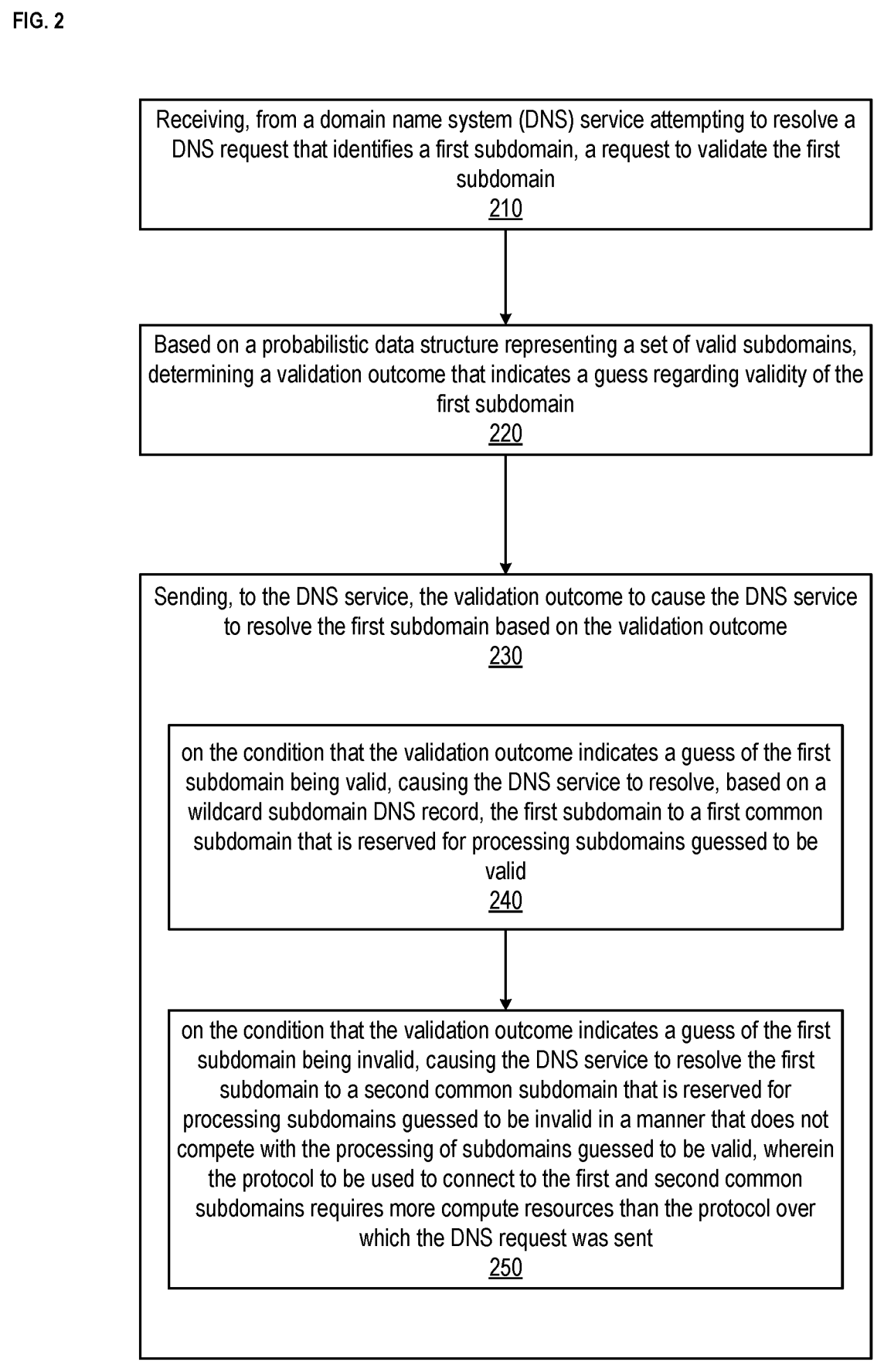

Receiving, from a domain name system (DNS) service attempting to resolve a DNS request that identifies a first subdomain, a request to validate the first subdomain
210

Based on a probabilistic data structure representing a set of valid subdomains, determining a validation outcome that indicates a guess regarding validity of the first subdomain
220

Sending, to the DNS service, the validation outcome to cause the DNS service to resolve the first subdomain based on the validation outcome
230 on the condition that the validation outcome indicates a guess of the first subdomain being valid, causing the DNS service to resolve, based on a wildcard subdomain DNS record, the first subdomain to a first common subdomain that is reserved for processing subdomains guessed to be valid
240 on the condition that the validation outcome indicates a guess of the first subdomain being invalid, causing the DNS service to resolve the first subdomain to a second common subdomain that is reserved for processing subdomains guessed to be invalid in a manner that does not compete with the processing of subdomains guessed to be valid, wherein the protocol to be used to connect to the first and second common subdomains requires more compute resources than the protocol over which the DNS request was sent
250

PROBABILISTIC WILDCARD-BASED DNS RESOLUTION

TECHNICAL FIELD

One or more implementations relate to the field of domain name system (DNS) resolution; and more specifically, to wildcard-based DNS resolution.

DESCRIPTION OF THE RELATED ART

In the context of the Internet, domains (e.g., example.com) and subdomains (e.g., subdomain. example.com) serve to identify Internet/web resources (e.g., web pages, software-as-a-service (SaaS) services, email services, etc.) with a text-based label that is easily recognizable and/or memoizable. These Internet resources, however, are typically only reachable via the internet protocol (IP) address of the computer device that hosts them. A domain name system (DNS) is a system that associates a domain or subdomain with a corresponding IP address and, during operation, performs a process called DNS resolution that translates a domain/subdomain identified in a DNS request to a corresponding IP address by evaluating one or more DNS records. In some cases, the domain/subdomain identified in a DNS request is directly associated with an IP address in a DNS record. In other cases, the domain/subdomain identified in a DNS request is indirectly associated with an IP address via domain/subdomain alias(es) in one or more intermediate DNS records.

Each domain in a DNS is managed by a DNS zone (which is a portion of the namespace of the DNS). Specifically, each DNS zone includes all the DNS records for a given domain. Each DNS zone also includes its own set of one or more DNS servers (e.g., name server(s) for resolving DNS requests that identify the given domain and its subdomains).

In some DNS implementations, a DNS zone includes multiple subdomains and many or all of the subdomains may have associated DNS records. For example, these DNS records may include a type of records (i.e., an A record) that associates a subdomain with an IP address. As another example, these DNS records may include a type of records (i.e., a CNAME record) that associate a subdomain with a second subdomain, which is then associated with an IP address in an A record. In some situations, as the number of subdomains in a DNS zone grows, the number of the associated DNS records may reach the maximum number of DNS records that can be supported by the DNS zone (which is a typical limitation in a DNS implementation due to the fact that DNS standards are designed to scale primarily to the number of DNS zones (and not to the number of DNS records)) and cannot scale up past that maximum. There are many situations in which this may happen. For example, for Software-as-a-Service (SaaS) implemented using a multi-tenancy architecture, a different subdomain can be assigned to and provisioned for each tenant and is used to identify the resources (e.g., web page(s)) and/or services (e.g., SaaS services/application(s)) that are customized specifically for that tenant. In such a situation, as the number of tenants grows, the number of DNS records also grows and may reach the maximum of DNS records that can be supported. By way of another example, in some cases, for SaaS implemented for an organization using a single-tenancy architecture, a different subdomain can be assigned to a different service provided by the organization. In such cases, as the number of services grows, the number of DNS records may also outgrow the maximum of DNS records.

In those situations, one solution to circumvent this limitation of a DNS implementation is to implement a wildcard DNS record. Specifically, a wildcard DNS record is a DNS record that associates a wildcard subdomain (e.g., *.example.com) to a defined subdomain within the same domain (e.g., definedsubdomain.example.com) or an IP address for the defined subdomain. In the former case, intermediate DNS record(s) will also be implemented to translate the defined subdomain to an IP address as described above. In such an implementation, regardless of what subdomain of a given domain is identified in a DNS request sent by a DNS client (e.g., a web browser or an email client on an end user device), that subdomain will match the wildcard subdomain and be resolved to the same IP address that identifies the host (physical or virtual) that is configured to handle requests (e.g., web requests, simple mail transport protocol (SMTP) requests/commands, etc.) from the DNS client.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2 is a flow diagram illustrating one aspect of probabilistic wildcard-based DNS resolution according to some example implementations.

DETAILED DESCRIPTION

The following description describes implementations for enhancing the wildcard-based DNS resolution process by first guessing the validity of a subdomain identified in a DNS request from a client application (e.g., a browser) using a probabilistic data structure (e.g., a bloom filter) that offers fast set membership validation before resolving the subdomain. If the subdomain is guessed to be valid, the subdomain is resolved to a primary subdomain handler hosted on a server (e.g., a proxy server) and web resource requests (e.g., http requests) from the client application are then sent to the primary subdomain handler. If the subdomain is guessed to be invalid, the subdomain is resolved to a secondary subdomain handler hosted on a different server (e.g., a proxy server) (which may be hosted on the same or a different electronic device/physical machine) in a manner that guessed invalid web resource requests (such as malicious malformed requests) do not compete for computing resources with the guessed valid ones.

Figure 1A:
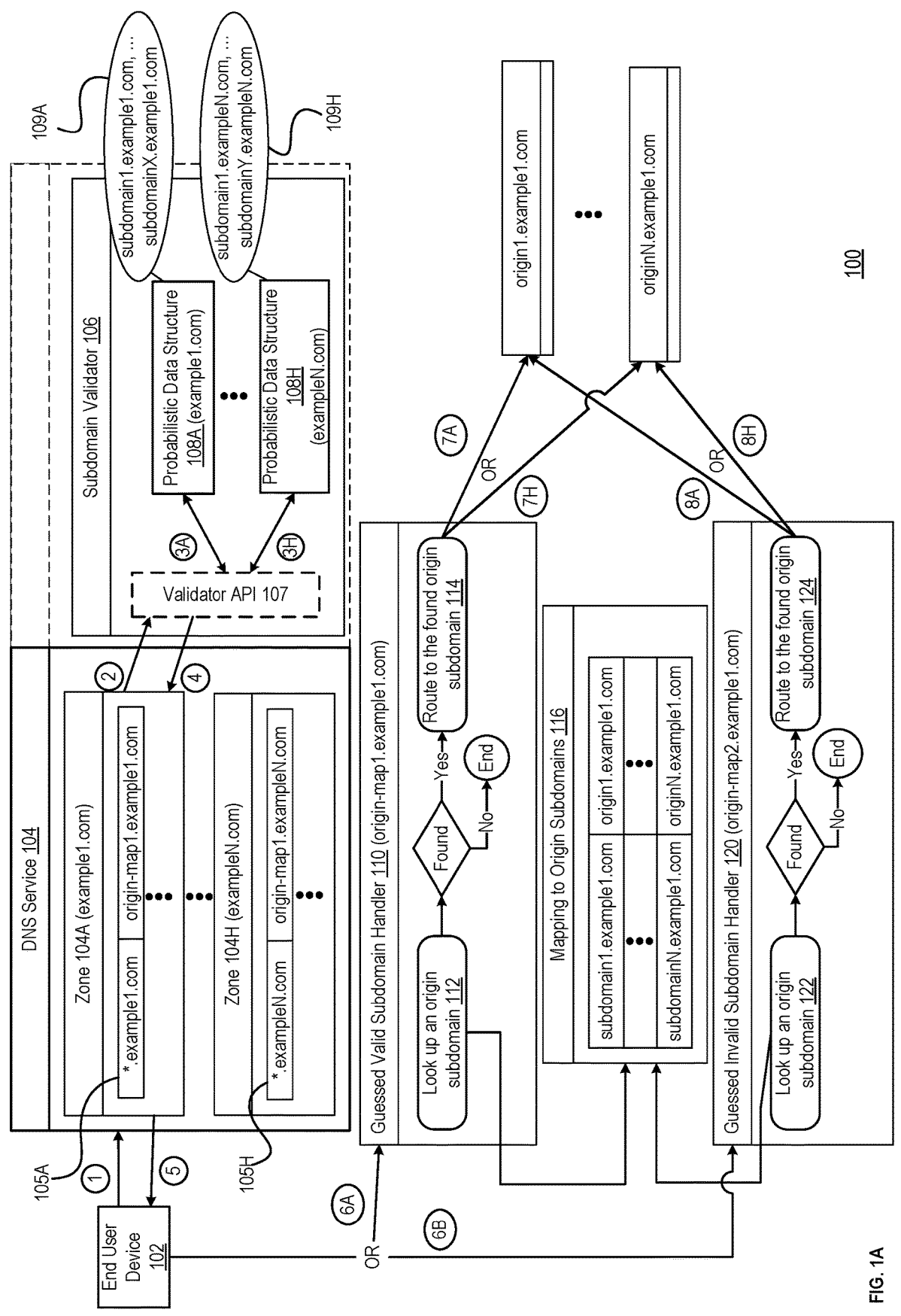
FIG. 1A is a block diagram illustrating one aspect of probabilistic wildcard-based DNS resolution according to some example implementations.

FIG. 1A is a block diagram illustrating one aspect of probabilistic wildcard-based DNS resolution according to some example implementations. The environment 100 includes an end user device 102, a DNS service 104, a subdomain validator 106, a guessed valid subdomain handler 110, and a guessed invalid subdomain handler 120.

The DNS service 104 is a service/system that performs DNS resolution. The DNS service 104 is organized in one or more DNS zones 104A through 104H where each DNS zone supports a domain. For example, the DNS zones 104A through 104H may respectively support domains example1.com through exampleN.com. Each of the DNS zones may implement one or more servers (e.g., resolver(s), name server(s), etc.) (not shown) to support DNS resolution. Each of the DNS zones may also implement data storage of DNS records to support DNS resolution. For example, the DNS zone 104A may implement data storage that includes a wildcard DNS record (e.g., a CNAME record) for resolving a wildcard subdomain (e.g., *.example1.com) to a common subdomain (e.g., origin-map1.example1.com) that all subdomains of example1.com are resolved to. The common subdomain is then resolved to an IP address based on another DNS record (e.g., an A record).

The subdomain validator 106 is a service/system that attempts to perform validation of the subdomains identified in DNS requests. In the example implementation approaches shown in FIGS. 1A-1B (further described later herein), it is implemented using one or more probabilistic data structures 108A through 108H. A probabilistic data structure is a data structure that provides approximate answers to queries about a large dataset, rather than exact answers. It is designed to handle large amounts of data with quick response time, by making trade-offs between accuracy and time and space efficiency. A bloom filter is an example of such data structures that use multi-way hashing to encode a large dataset into a bit-mask/bit-map (also referred to as a signature). Typically, the more bits that are used for the signature, the more accurate the answers (e.g., a lower false positive rate); however, more accuracy leads to higher computation costs. For example, a signature of 4 bytes can summarize 1 million subdomains with a 1% false positive rate.

Continuing with the above exemplary domains supported by the DNS zones 104A-H, probabilistic data structures 108A through probabilistic data structure 108H respectively represent/encode a set of valid subdomains 190A (e.g., for domain example1.com) through a set of valid subdomains 190N (e.g., for domain exampleN.com). For example, the probabilistic data structure 108A represents/encodes the set of valid subdomains 190A that includes subdomain1.example1.com through subdomainX.example1.com.

While the DNS service 104 is typically implemented by a DNS provider, the subdomain validator 106 may be implemented with various different approaches by various different entities.

In a first approach, the subdomain validator 106 may be implemented by a third-party service provider who is neither the DNS provider nor a provider of subdomains for which DNS resolution is performed (e.g., in a different data center than the data center that hosts the DNS service 104) In FIG. 1A, this implementation of the subdomain validator 106 is illustrated as the subdomain validator 106 block being outside the DNS service 104 solid-line block. The third-party service provider may provide a way for each provider of subdomains to add, update, and/or delete valid subdomains in the probabilistic data structure provisioned specifically for that provider. For example, the probabilistic data structures 108A-H may be provisioned respectively for the providers of the sets of valid subdomains 109A-H. In some implementations, an API (or any other type of suitable programming interface) and/or a user interface (e.g., a web-based admin interface) (not shown) may be provided by the subdomain validator 106 for the providers of the sets of valid subdomains 109 to interface and manage (e.g., add, update, and/or delete) valid subdomain(s) in their respective probabilistic data structures. In some other implementations, a separate API and/or user interface may be implemented for each of the probabilistic data structures 108 so that each of the providers of the sets of valid subdomains 109 manage its respective probabilistic data structure via its respective API and/or user interface. Being implemented outside the DNS service 104, the first approach provides for the advantage(s) of keeping the implementation of approximate validation of subdomains within the DNS service 104 relatively simple because the DNS service 104 only needs to implement the logic for interfacing with the subdomain validator 106 and the implementations for managing probabilistic data structures are provided by the third-party service provider.

In a second approach, the subdomain validator 106 may be implemented by the DNS provider (e.g., as part of the DNS service 104 (e.g., as a subsystem) and in the same data center as the data center that hosts the DNS service 104). In FIG. 1A, this implementation of the subdomain validator 106 is illustrated as the subdomain validator 106 block being inside the DNS service 104 solid-line block extended by the dashed-line block. In a first variation of the second approach, the subdomain validator 106 is a customized solution that the DNS service provider implements for specific provider(s) of subdomains (i.e., in addition to the standard implementation of DNS according to the DNS standard(s)). For example, each of the probabilistic data structures 108 may be implemented as some non-standard/custom logic that serves the respective one of the providers of the sets of valid subdomains 109 (e.g., as a result of an agreement between the two entities). In a second variation of the second approach, the subdomain validator 106 is part of the standard implementation of the DNS service 104 according to the DNS standard(s) (e.g., after the capabilities of the subdomain validator 106 have been adopted into the DNS standard(s), which is not the case as of the writing of the present patent application). More specifically, each of the probabilistic data structures 108 may be provisioned for the respective one of the providers of the sets of valid subdomains 109 without the need for the two entities to reach an agreement. Similar to the first approach, in both variations of the second approach, a probabilistic data structure may be managed by an API/user interface implemented specially to serve that probabilistic data structure or by a single API/user interface implemented to serve all the probabilistic data structures. Being implemented as part of the DNS service 104, the second approach provides for the advantage(s) of potentially avoiding the network traffic between the DNS service 104 and the subdomain validator 106 and consequently quicker response time when resolving DNS requests.

Figure 1B:
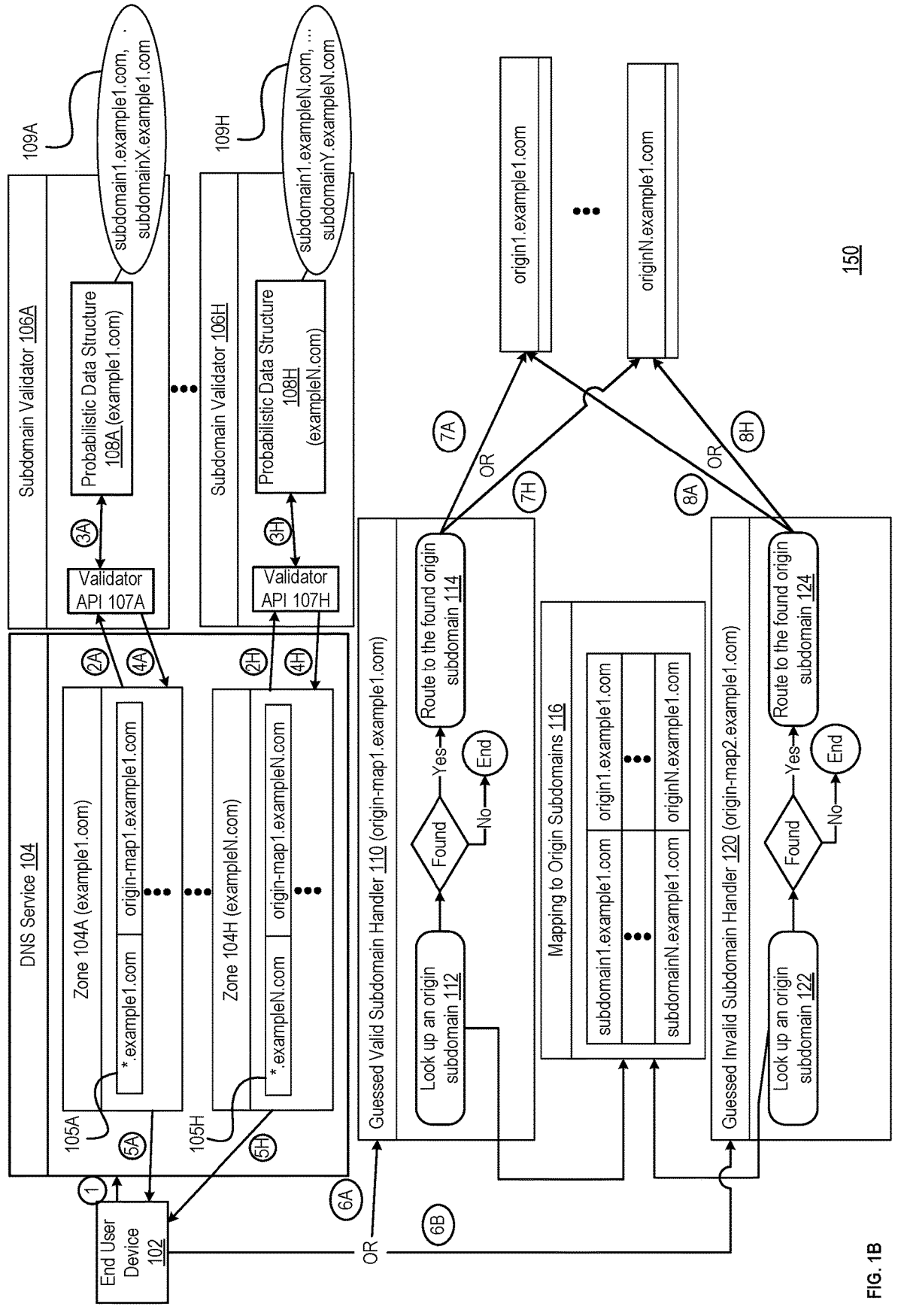
FIG. 1B is a block diagram illustrating another aspect of probabilistic wildcard-based DNS resolution according to some example implementations.

In a third approach (shown in FIG. 1B (not FIG. 1A)), a different instance of the subdomain validator 106 may be implemented by each provider of subdomains outside the DNS service 104 (e.g., in a different data center than the data center that hosts the DNS service 104). More detail of the implementation of this approach is described later with respect to FIG. 1B. Similar to the first approach, being implemented outside the DNS service 104, the third approach provides for the advantage(s) of keeping the implementation of approximate validation of subdomains within the DNS service 104 relatively simple.

The DNS service 104 in conjunction with the subdomain validator 106 may perform one or more operations to attempt to validate a subdomain identified in a DNS request while resolving the DNS request. At operation 1, the end user device 102 (via a web browser) sends a DNS request that identifies a subdomain. According to a first example, assume the DNS request was initiated in response to an end user requesting (e.g., via a web browser) a web resource (e.g., a web page, a SaaS service, etc.) that is hosted at subdomain1.example1.com (also referred to as a first subdomain), and thus that the DNS request identifies subdomain1.example1.com. Typically, the user datagram protocol (UDP) is used for resolving DNS requests (e.g., at operation 1 here and operation 4 described later herein). The UDP protocol is a connectionless protocol that is lightweight.

In response, the DNS service 104 may attempt to resolve the DNS request by performing one or more operations. In this first example, the DNS service 104 may determine that the DNS zone 104A supports resolving such a DNS request and in response, at operation 2, the DNS zone 104A may send (e.g., via a name server or resolving server) a request, to validate the subdomain identified in the DNS request (subdomain1.example1.com in this first example), to a validator API 107 (e.g., under the first implementation approach of the subdomain validator 106). In response, according to this first example, the validator API 107 may determine that the probabilistic data structure 108A supports the domain example1.com and may, at operation 3A, perform a lookup of subdomain1.example1.com in the probabilistic data structure 108A. Alternatively, under the second implementation approach of the subdomain validator 106, because the subdomain validator 106 is internal to the DNS service 104, the validator API 107 may not be implemented and the internal implementation of the subdomain validator 106 may be used to directly interact with the probabilistic data structure 108A to perform such a lookup.

In response, according to this first example, the probabilistic data structure 108A may attempt to determine whether subdomain1.example1.com is a member of the set of valid subdomain 109A and, as a result, may determine, a guess, as a validation outcome, that subdomain1.example1.com is valid (e.g., a guess that subdomain1.example1.com is a member of the set of valid subdomains 109A). As shown in the set of valid subdomains 109A, subdomain1.example1.com is in fact one of the valid subdomains. Thus, in this case the guess is a true positive. However, that the guess is a true positive is not confirmed until a guessed valid subdomain handler 110 processes subdomain1.example1.com as described in more detail later herein.

In response to the determination of a validation outcome (such as the validation outcome above), at operation 4, the validation outcome is sent back to the DNS zone 104A to cause the subdomain identified in the DNS request (subdomain1.example1.com in this first example) to be resolved. In response to the validation outcome, the DNS zone 104A may resolve the subdomain identified in the DNS request in a manner such that the resolved subdomain will cause the end user device 102 to send a web resource request with a subdomain guessed to be valid to the guessed valid subdomain handler 110 and a web resource request with subdomain guessed to be invalid to the guessed invalid subdomain handler 120. In this first example, the DNS zone 104A may determine that the validation outcome indicates a guess that subdomain1.example1.com is valid and in response resolve subdomain1.example1.com based on a wildcard subdomain DNS record 105A. As shown in FIG. 1A, the wildcard subdomain DNS record 105A is used to resolve all subdomains of example1.com to a subdomain origin-map1.example1.com (also referred to as a first common subdomain). Another DNS record (not shown) (e.g., an A record) may be used to resolve subdomain1.example1.com to an IP address from which the web resources (e.g., a web page, a SaaS service, etc.) described above can be retrieved. In some implementations, the IP address may be the IP address of an electronic device/physical machine (also referred to as a physical host) that serves as a proxy (also referred to as a proxy server, such as a reverse proxy) that routes/forwards the web resource request to where the web resources may be hosted. In some other implementations, the IP address may be the IP address of a virtual machine (also referred to as virtual host) that serves as a proxy (also referred to as a proxy server, such as a reverse proxy) that routes/forwards the web resource request to where the web resources may be hosted. In such implementations, more than one proxy servers may be hosted on an electronic device/physical machine, where the proxy servers share the compute resources of the physical machine. Regardless of whether the IP address identifies a physical or virtual machine, in the above example, the guessed valid subdomain handler 110 may be a proxy server that can be reached via the IP address (hereinafter referred to as the IP for the guessed valid subdomain handler 110).

Continuing with the first example above, at operation 5, the IP for the guessed valid subdomain handler 110 is returned to the end user device 102 as the response to the DNS request initiated at operation 1 above. In such a manner, the DNS request from the end user device 102 is resolved in the manner described above.

In response, the end user device 102 may proceed with retrieving, using the IP address, the web resource requested by the end user via the end user device 102 as described in operation 1 above. In this first example, at operation 6A, the end user device 102 may send to the IP address for the guessed valid subdomain handler 110 a web resource request (e.g., an HTTP request) that identifies subdomain1.example1.com and the location of the web resource requested (e.g., a path in the web resource request).

Continuing with the first example, in response to operation 6A, the guessed valid subdomain handler 110 may perform one or more operations to retrieve the resource(s) requested by the web resource request. To set the context for these responsive operations relative to operations 1 through 5, as shown above, subdomain1.example1.com is resolved to another subdomain (i.e., origin-map1.example1.com) and is not resolved to an IP address where web resources can be retrieved. That is, subdomain1.example1.com is an alias subdomain and does not directly identify where the requested web resource is actually hosted. Then when all alias subdomains such as subdomain1.example1.com are resolved to a common subdomain (i.e., origin-map1.example1.com), origin-map1.example1.com does not directly identify where requested web resources are actually hosted either but rather identify where web resource requests that identify these alias subdomains should be sent for further processing. More specifically in this first example, the above-mentioned responsive operations are performed by the guessed valid subdomain handler 110 as described below to process the web resource request that identifies subdomain1.example1.com. For example, at operation 112, the guessed valid subdomain handler 110 may attempt to look up an origin subdomain that corresponds to the subdomain identified in the web resource request (subdomain1.example1.com in this first example). Such an origin subdomain identifies the subdomain (e.g., a location such as an IP address for a web server) where the requested web resource is actually hosted and can be retrieved. More specifically, the lookup is performed against a mapping to origin subdomains 116 where the subdomain identified in a web resource request is mapped to a corresponding origin subdomain. One example implementation for such a mapping is a key-value store. As shown in FIG. 1A, the mapping to origin subdomains 116 includes a key-value pair that maps subdomain1.example1.com to origin1.example1.com. Accordingly, origin1.example1.com is found as the result of the operation 112. In such a manner, the guess that subdomain1.example1.com is valid is also confirmed as a true positive. In response, at operation 114, the web resource request is routed/forwarded to the found origin subdomain. More specifically, at operation 7A, the web resource request is routed/forwarded to origin1.example1.com to retrieve the requested web resource from origin1.example1.com. In response, the requested service/web resource is retrieved from the origin1.example1.com and made available to the end user device 102.

As described in the above first example, a valid subdomain subdomain1.example1.com is identified in the DNS request. In a second example, the DNS request at operation 1 may identify a subdomain that is not one of the subdomains in the set of valid subdomains 109A (referred to as a second subdomain). In the second example, also assume that a validation outcome that indicates a guess of the second subdomain being invalid is determined, and thus that the DNS zone 104A resolves the second subdomain to orgin-map2.example1.com (also referred to as a second common subdomain) not based on the wildcard subdomain DNS record 105A. For example, the resolution may be based on at least a TXT record (not shown) that includes orgin-map2.example1.com. Orgin-map2.example1.com may be further resolved to the IP address of the guessed invalid subdomain handler 120.

Unlike the guessed valid subdomain handler 110, the guessed invalid subdomain handler 120 is reserved for processing web resource requests that identify subdomains of example1.com that are guessed to be invalid by the subdomain validator 106. In this second example, at operation 6B, the guessed invalid subdomain handler 120 may perform one or more operations to attempt to retrieve the resource(s) requested by a web resource request that identifies the second subdomain. However, the operation 122 against the mapping to origin subdomains 116 will not be able to find the second subdomain and the flow of operations ends. In such a manner, the guess that the second subdomain is invalid is also confirmed as a true negative.

The guessed invalid subdomain handler 120 is implemented in a manner such that its processing of web resource requests does not compete (e.g., for compute resources) with the processing of web resource requests by the guessed valid subdomain handler 110. While additional resources are required to generate the guesses as to the validity of the subdomains, it was found that the cost to do so was outweighed by the ability to send the traffic to the different subdomain handlers. This is in part because: 1) the UDP protocol used for the DNS requests is less resource intensive than the transmission control protocol (TCP) protocol that is typically used for establishing and maintaining connections (including the sending of the web resource requests) between an end user device (e.g., end user device 102) and a server (e.g., a proxy server, such as the guessed valid subdomain handler 110 or the guessed invalid subdomain handler 120); and 2) the amount of time and resources required for the accessing the probabilistic data structures 108A through 108H are low relative to a structure like the mapping to origin subdomains 116. Also, the separation of compute resources means that a large volume of web resource requests generated responsive to a large volume of DNS requests with invalid subdomains (assuming most are correctly guessed to be invalid) will not interfere with the processing of web resource requests generated responsive to DNS requests correctly guessed to include valid subdomains. Thus, for DNS requests for which guesses as to validity of the subdomains are made, the guesses are made during the use of the less resource intensive protocol and with a relatively fast and low resource data structure; meaning that the cost to do so is sufficiently low relative to the subdomain handler compute resources required for the more resource intensive protocol and the risk of guessed invalid web resource requests interfering with guessed valid web resource requests.

Implementing the subdomain handlers such that the guessed invalid web resource requests do not compete with the guessed valid web resources requests may be accomplished in a variety of ways. For example, in some implementations, the guessed invalid subdomain handler 120 and the guessed valid subdomain handler 110 are implemented on different electronic devices/physical machines. In some other implementations, the guessed invalid subdomain handler 120 and the guessed valid subdomain handler 110 are implemented on the same electronic device/physical machine where the guessed invalid subdomain handler 120 is assigned a lower process priority than the guessed valid subdomain handler 110 (or is assigned to a namespace with a lower process priority or is otherwise configured not to compete with the guessed valid subdomain handler 110 for compute resources).

In a third example, the second subdomain identified in the DNS request (operation 1) is not one of the subdomains in the set of valid subdomains 109A, but a validation outcome indicates a guess of the second subdomain being valid due to the probabilistic nature of the data structure (operations 2, 3x, and 4, where x distinguishes operations 3A-H). In this third example, responsive to operation 4, the DNS zone 104A may still resolve the second subdomain to orgin-map1.example1.com (and eventually the IP address of the guessed valid subdomain handler 110). However, responsive to operation 6A, when the guessed valid subdomain handler 110 performs the operation 112 against the mapping to origin subdomains 116, it will not be able to find the second subdomain and the flow of operations ends. In such a manner, the guess that the second subdomain is valid (a false positive) is invalidated.

In a fourth example, the DNS request identifies the first subdomain (subdomain1.example1.com) (operation 1), but it is guessed that the first subdomain is invalid (a false negative due to the probabilistic nature of the data structure) even though subdomain1.example1.com is one of the valid subdomains as described above in the first example (operations 2, 3x, and 4, where x distinguishes operations 3A-H). In this fourth example, responsive to operation 5, the end user device 102, at operation 6B, will send a web resource request identifying subdomain1.example1.com toward IP address of the guessed invalid subdomain handler 120. In response, when the guessed invalid subdomain handler 120 performs the operation 122 against the mapping to origin subdomains 116, it will actually be able to find subdomain1.example1.com. In response, at operation 124 (like at operation 114), the flow of operations is redirected to the found origin subdomain. More specifically, at operation 8A, the web resource request is routed/forwarded to origin1.example1.com to retrieve the requested web resource from origin1.example1.com. In response, the requested service/web resource is retrieved from the origin1.example1.com and made available to the end user device 102. In such a manner, a false negative guess has been invalidated.

The implementations and operations described above provide advantage(s) over prior art. Existing implementations using wildcard subdomain DNS records typically resolve subdomains identified in a DNS request to a common subdomain without first validating the subdomains. As a result, well-intentioned as well as malicious web resource requests identifying malformed, invalid subdomains are sent to the same common subdomain as web resource requests identifying valid subdomains. In this manner, web resource requests identifying invalid subdomains are competing with web resource requests identifying valid subdomains for compute resources on the common subdomain (or more specifically, the proxy server that hosts the common subdomain) while establishing and maintaining connections with the common subdomain. In some cases, due to the fact that the TCP protocol used for such connections is compute resource-intensive as compared to UDP (see above), malicious web resource requests identifying invalid subdomains may consume the compute resources otherwise allocated to the guessed valid web resource requests to an extent that may amount to a "denial of service."

On the other hand, the implementations and operations described herein do not indiscriminately resolve subdomains identified in web resource requests. In particular, as described above, valid subdomains and invalid subdomains are resolved to two different common subdomains such that the processing of web resource requests guessed to be identifying invalid subdomains do not compete with the processing of web resource requests guessed to be identifying valid subdomains. In such a manner, the potential for malicious requests with malformed subdomains to cause a denial of service is largely reduced if not completely eliminated.

While the example implementation approaches of the subdomain validator 106 described above and later in FIG. 1B use probabilistic data structure(s), in some other implementations, instead of probabilistic data structure(s), a data structure such as the mapping to origin subdomains 116 described above may be used to implement the subdomain validator 106. In particular, when a subdomain is found as a key in the mapping, the subdomain can be determined valid; and when a subdomain is not found as key in the mapping, the subdomain can be determined invalid. Because such a data structure stores and allows queries against actual data, it provides 100% accuracy (with the tradeoff of slower response time during the time critical DNS request processing). Also, because a validation outcome based on such a data structure is 100% accurate, a validation outcome that indicates a subdomain is invalid is always a true negative and can never be a false negative. Thus, in these implementations, the guessed invalid subdomain handler 120 is not implemented because there is no need to process web resource requests identifying guessed invalid subdomains that are actually valid (false negatives) and, in response, retrieve the requested resource (e.g., as described by operations 6B, 122, 124, and 8A above). On the other hand, with respect to true negatives, in these implementations, the DNS service 104 is implemented in a manner such that it handles them within the DNS resolution process and does not cause the end user device 102 to send web resource requests that identify them. That is in part because, as explained in a related context above, the UDP protocol used for the DNS requests is less resource intensive than the transmission control protocol (TCP) protocol that is typically used for establishing and maintaining connections (including the sending of the web resource requests) between an end user device (e.g., end user device 102) and a server (e.g., a proxy server, such as the guessed invalid subdomain handler 120). More specifically, in response to a validation outcome that indicates a subdomain is invalid, in these implementations, the DNS service 104 aborts the DNS resolution effort and instead returns a DNS resolution error to the end user device 102 to cause the end user device 102 to abort its normal operation of requesting web resources based on a resolved subdomain as well.

FIG. 1B is a block diagram illustrating another aspect of probabilistic wildcard-based DNS resolution according to some example implementations. FIG. 1B is illustrated using an environment 150 that includes the same elements in the environment 100 in FIG. 1A except for the subdomain validator 106. Thus, FIG. 1B will be described in relation to FIG. 1A while focusing on this difference. Specifically, a different instance of the subdomain validator 106 is implemented outside the DNS service 104 by each of the providers of the sets of valid subdomains 190. For example, as illustrated, the subdomain validators 106A-H are implemented and each of them includes a respective one of the probabilistic data structures 108A-H (along with a respective API/user interface for managing the respective probabilistic data structure). In addition, each of the subdomain validators 106A-H respectively implements a respective one of validator APIs 107A-H and each of the validator APIs 107A-H serves as a lookup/query interface for the respective one of the probabilistic data structures 108A-H.

During operation, similar to FIG. 1A, the DNS service 104 in conjunction with a specific instance the subdomain validator 106 attempts to validate a subdomain identified in a DNS request while resolving the DNS request. In particular, operations 1, 2A, 3A-H, 4A-H, and 5A-H are performed similarly to how operations 1, 2, 3A-H, 4, and 5 are performed, respectively, as described in FIG. 1A. And operations 1, 2A, 3A-H, 4A-H, and 5A-H are performed similarly to how operations 1, 2A-H, 3A-H, 4A-H, and 5A-H are performed, respectively, as described in FIG. 1B.

FIG. 2 is a flow diagram illustrating one aspect of probabilistic wildcard-based DNS resolution according to some example implementations. The operations of FIG. 2 may be performed as described in further detail with respect to FIGS. 1A-B.

At operation 210 (e.g., operation 2 in FIG. 1A or one of the operations 2A-H in FIG. 1B), a request to validate the first subdomain is received from a domain name system (DNS) service (e.g., the DNS service 104) attempting to resolve a DNS request that identifies a first subdomain.

The flow of operations moves to operation 220 (e.g., one of the operations 3A-H in FIG. 1A or 1B), at which a validation outcome that indicates a guess regarding validity of the first subdomain may be determined based on a probabilistic data structure (e.g., one of the probabilistic data structures 108) representing a set of valid subdomains (e.g., one of the sets of valid subdomains 109). In the first example of FIGS. 1A-B, the first subdomain may be a subdomain (e.g., subdomain1.example1.com) that is in the set of valid subdomains 109A and a validation outcome that indicates a guess of the first subdomain being valid is determined (a true positive) based on the probabilistic data structure 108A. In the second example of FIGS. 1A-B, the first subdomain may be a subdomain that is not in the set of valid subdomains 109A and a validation outcome that indicates a guess of the first subdomain being invalid is determined (a true negative)

based on the probabilistic data structure 108A. In the third example of FIGS. 1A-B, the first subdomain may be a subdomain that is not in the set of valid subdomains 109A and a validation outcome that indicates a guess of the first subdomain being valid is determined (a false positive) based on the probabilistic data structure 108A due to the probabilistic nature of the data structure. In the fourth example of FIGS. 1A-B, the first subdomain may be a subdomain (e.g., subdomain1.example1.com) that is in the set of valid subdomains 109A and a validation outcome that indicates a guess of the first subdomain being invalid is determined (a false negative) based on the probabilistic data structure 108A due to the probabilistic nature of the data structure.

The flow of operations moves to operation 230 (e.g., at operation 4 in FIG. 1A), at which the validation outcome may be sent to the DNS service to cause the DNS service to resolve the first subdomain based on the validation outcome. More specifically, at operation 230, one of operations 240 and 250 is performed.

The flow of operations moves to operation 240, at which, on the condition that the validation outcome indicates a guess of the first subdomain being valid, the DNS service may be caused to resolve, based on a wildcard subdomain DNS record (e.g., one of the wildcard subdomain DNS records 105), the first subdomain to a first common subdomain (e.g., the common subdomain in the above-mentioned one of the wildcard subdomain DNS records 105) that is reserved for processing subdomains guessed to be valid.

In the first example of FIGS. 1A-B, because the validation outcome indicates a guess of the first subdomain being valid, the DNS service 104 is caused to resolve, based on a wildcard subdomain DNS record (e.g., the wildcard subdomain DNS record 105A), the first subdomain to a first common subdomain (e.g., origin-map1.example1.com). Further in this example, responsive to receiving a first web resource request at the first common subdomain where the first web resource request identifies the first subdomain that has been guessed to be valid, it is determined that the first subdomain is mapped to a first origin subdomain (e.g., origin1.example1.com). Specifically, the first origin subdomain identifies a location for a resource identified in first the web resource request. In response, the first web resource request is routed/forwarded to the first origin subdomain.

The flow operations moves to operation 250, at which, on the condition that the validation outcome indicates a guess of the first subdomain being invalid, the DNS service may be caused to resolve the first subdomain to a second common subdomain that is reserved for processing subdomains guessed to be invalid in a manner that does not compete with the processing of subdomains guessed to be valid. In the second example of FIGS. 1A-B, because the validation outcome indicates a guess of the first subdomain being invalid, the DNS service 104 is caused to resolve the first subdomain to a second common subdomain (e.g., origin-map2.example1.com). Further in this example, responsive to a second web resource request at the second common subdomain where the second web resource request identifies the first subdomain that has been guessed to be invalid, it is determined that the first subdomain is not mapped to any origin subdomains. In response, the operations are caused to abort.

Further, with respect to the operation 230 (including operations 240 and 250), the protocol that is used to connect to the first and second common subdomains requires more compute resources than the protocol over which the DNS request was sent.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code, while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
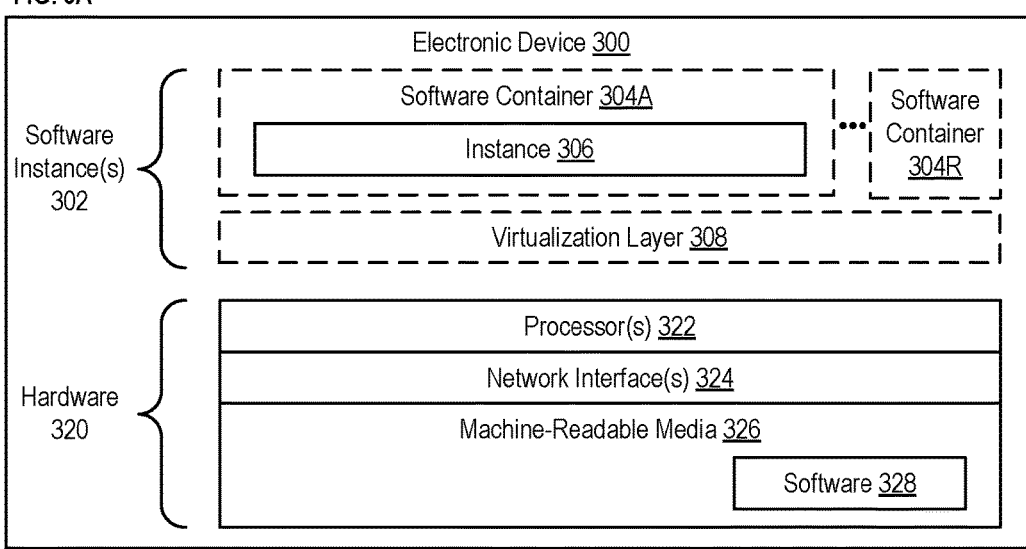
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. The DNS service 104, the subdomain validator 106

(or 106A-H), the guessed valid subdomain handler 110, the guessed invalid subdomain handler 120, and the origin subdomains may be implemented in one or more of electronic device 300. In one implementation: 1) there are multiple of end user device 102 and each is separate one of the electronic device 300 (e.g., where the software 328 represents the software to implement clients to interface directly and/or indirectly with the DNS service 104, the guessed valid subdomain handler 110, the guessed invalid subdomain handler 120, and the origin subdomains (e.g., software 328 represents a web browser, a DNS client, a native client, a portal, a command-line interface, and/or an application programming interface (API) based upon protocols such as Simple Object Access Protocol (SOAP), Representational State Transfer (REST), etc.)); and 2) the DNS service 104, subdomain validator 106 (or 106A-H), the guessed valid subdomain handler 110, the guessed invalid subdomain handler 120, and the origin subdomains are implemented in a separate set of one or more of electronic device 300 (e.g., a set of one or more server devices that each implement one or more of the roles of the DNS service 104, subdomain validator 106 (or 106A-H), the guessed valid subdomain handler 110, the guessed invalid subdomain handler 120, and the origin subdomains; and where the software 328 in each of these server devices represents the software to implement the role(s) implemented by that service device). In a first configuration of electronic devices, as stated previously with regard to some implementations, each of the DNS service 104, subdomain validator 106 (or 106A-H), the guessed valid subdomain handler 110, the guessed invalid subdomain handler 120, and the origin subdomains may each be implemented in separate ones of electronic devices 300. In a second configuration of electronic devices, the DNS service 104 and the subdomain validator 106 (or 106A-H) may be implemented on a single one of electronic device 300. In a third configuration of electronic devices, the guessed valid subdomain handler 110 and guessed invalid subdomain handler 120 may be implemented on a single one of electronic device 300. In a fourth configuration of electronic devices, some or all of the origin subdomains may be implemented on a single one of electronic device 300. Other configuration(s) may be a combination of any of the two or more of the second, third, and fourth configurations. In operation, these electronic devices would be communicatively coupled (e.g., by a network) and would establish between them (or through one or more other layers and/or or other services) connections for sending, depending on each electronic devices role, the DNS requests, subdomain validation requests, subdomain validation outcomes, DNS responses, web resource requests, etc.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and a set of one or more software containers, shown as software container 304A to software container 304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. Instances of the software 328, as well as the virtualization layer 308 and the software containers if implemented, are collectively referred to as software instance(s) 302.

Alternative implementations of an electronic device may have numerous variations from that described above. For example, customized hardware and/or accelerators might also be used in an electronic device.

Example Environment

Figure 3B:
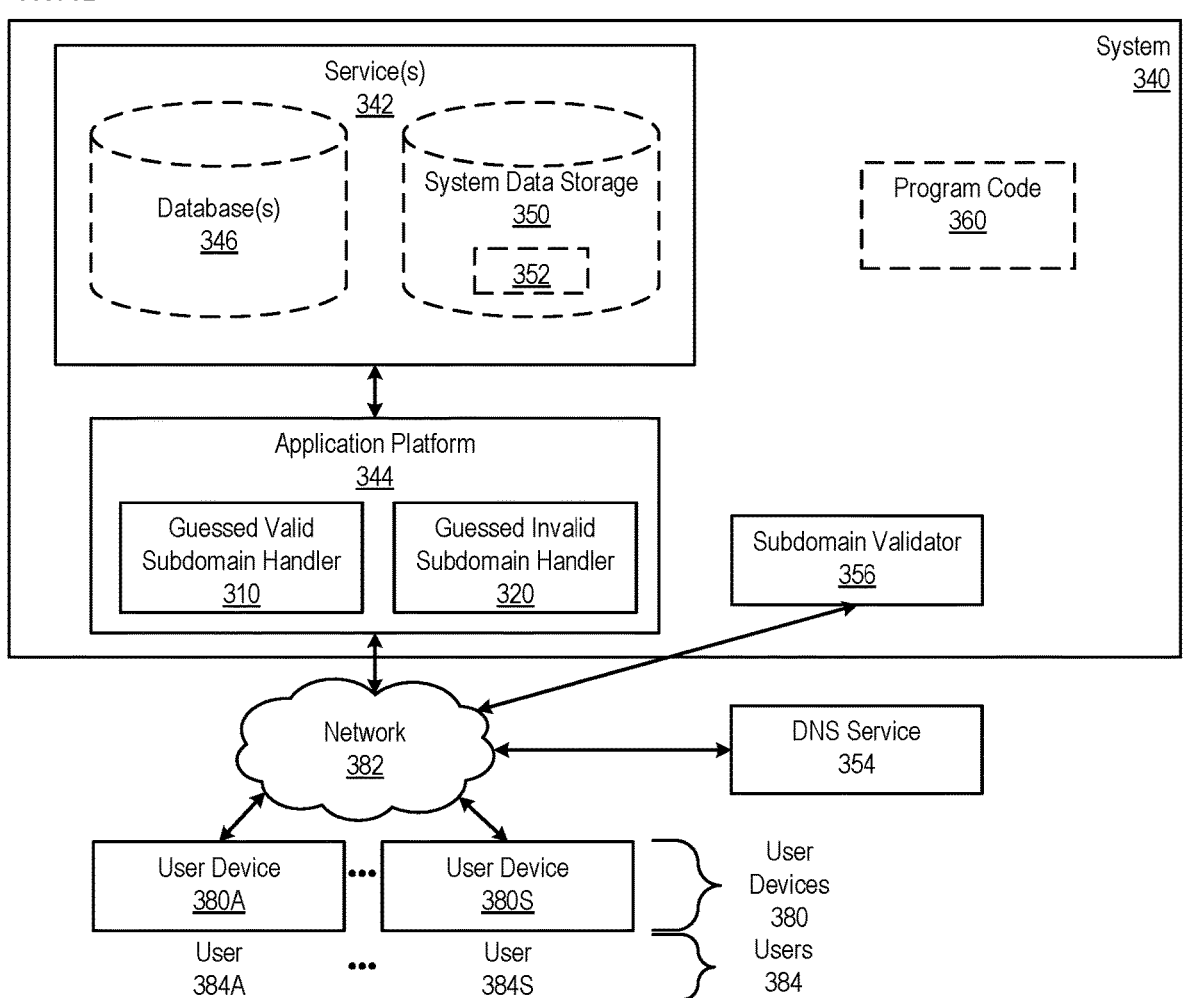
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including the service(s) that may be hosted at the origin subdomain(s) (e.g., origin1.example1.com through origin1.exampleN.com). The system 340 also includes a subdomain validator 356 (e.g., one of the subdomain validators 106A-H in FIG. 1B). In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380 (shown as user device 380A to user device 380S) over a network 382. The service(s) 342 may be on-demand services that are made available to users 384 (shown as user 384A to user 384S) working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users). The service(s) 342 may communicate with each other and/or with one or more of the user devices 380 via one or more APIs (e.g., a REST API). In some implementations, the user devices 380 are operated by the users 384, and each may be operated as a client device and/or a server device. In some implementations, one or more of the user devices 380 are separate ones of the electronic device 300 or include one or more features of the electronic device 300. The system 340 is also coupled to a DNS service 354 (e.g., the DNS service 104 in FIG. 1A or FIG. 1B) over the network 382. The subdomain validator 356 may be made available (e.g., via API) to the DNS service 354. For example, when attempting to resolve DNS requests sent (over the network 382) from the user devices 380, the DNS service 354 may communicate with the subdomain validator 356 (over the network 382) to validate the subdomains identified in the DNS requests.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant typically includes a group of users with access to at least some of the same data/functionality with the same or similar privileges/permissions. Tenants may be different entities (e.g., different companies, different departments/divisions of a company, and/or other types of entities), and some or all these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all the third-party application developers.

Multi-tenancy can be implemented in different ways. In some implementations, a multi-tenant architecture may include software instance(s) that are shared by multiple tenants (e.g., a single database instance share by multiple tenants, sometime referred to as a multi-tenant database; a single application instance shared by multiple tenants, sometimes referred to as a multi-tenant application; a single application instance and a single database instance shared by multiple tenants; an application instance per tenant and a database instance shared by multiple tenants; a single application instance share by multiple tenants and a database instance per tenant).

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM); some or all of which may be hosted at the origin subdomain(s) (e.g., origin1.example1.com through origin1.exampleN.com).

For example, system 340 may include an application platform 344 that enables PAAS for creating, managing, and executing one or more applications developed by the provider of the application platform 344, users accessing the system 340 via one or more of the user devices 380, or third-party application developers accessing the system 340 via one or more of user devices 380. The application platform 344 may include a guessed valid subdomain handler 310 (e.g., the guessed valid subdomain handler 110) and a guessed invalid subdomain handler 354 (e.g., the guessed invalid subdomain handler 120). As described in FIGS. 1A-B, these handlers may allow for confirming the validity of the requests (e.g., service/web resource requests) from the user devices 380 before permitting them to access the service(s) 342.

In some implementations, one or more of the service(s) 342 may use one or more database(s) 346 and/or system data storage 350 (which stores system data 352). In certain implementations, the system 340 includes a set of one or more servers that are running on server electronic devices and that are configured to handle requests for any authorized user associated with any tenant (there is no server affinity for a user and/or tenant to a specific server). The user devices 380 communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the database(s) 346 and/or system data storage 350.

In some implementations, the service(s) 342 are implemented using virtual applications dynamically created at run time responsive to queries from the user devices 380 and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the service(s) that may be hosted at the origin subdomain(s), may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380.

Each of the user devices 380 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384 to interact with various GUI pages that may be presented to the one or more of users 384. The user devices 380 may communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more the user devices 380 may include an HTTP client, commonly referred to as a "browser," for sending and receiving HTTP messages to and from server(s) of system 340, thus allowing one or more of the users 384 to access, process and view information, pages and applications available from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a set of one or more processors, are configurable to cause said set of one or more processors to perform operations comprising:

receiving, from a domain name system (DNS) service attempting to resolve a DNS request that identifies a first subdomain, a request to validate the first subdomain;

based on a probabilistic data structure representing a set of valid subdomains, determining a validation outcome that indicates a guess regarding validity of the first subdomain; and sending, to the DNS service, the validation outcome to cause the DNS service to resolve the first subdomain based on the validation outcome as follows:

on the condition that the validation outcome indicates a guess of the first subdomain being valid, causing the DNS service to resolve, based on a wildcard subdomain DNS record, the first subdomain to a first common subdomain that is reserved for processing subdomains guessed to be valid, and on the condition that the validation outcome indicates a guess of the first subdomain being invalid, causing the DNS service to resolve the first subdomain to a second common subdomain that is reserved for processing subdomains guessed to be invalid in a manner that does not compete with the processing of subdomains guessed to be valid, wherein the protocol to be used to connect to the first and second common subdomains requires more compute resources than the protocol over which the DNS request was sent.

2. The non-transitory machine-readable storage medium of claim 1, wherein the protocol over which the DNS request was sent is user datagram protocol (UDP), and wherein the protocol to be used to connect to the first and second common subdomains is transmission control protocol (TCP).

3. The non-transitory machine-readable storage medium of claim 1, wherein a first domain is identified in the first subdomain, the first common subdomain, the second common subdomain, and each of the set of valid subdomains.

4. The non-transitory machine-readable storage medium of claim 1, the operations further comprising:

in response to a request to add a valid subdomain, causing the valid subdomain to be encoded in the probabilistic data structure.

5. The non-transitory machine-readable storage medium of claim 4, wherein the request to add a valid subdomain is received via a user interface that is provided to an administrator for a provider of the set of valid subdomains.

6. The non-transitory machine-readable storage medium of claim 1, wherein the operations are performed by a provider of the set of valid subdomains, and wherein the first and second common subdomains are implemented by the provider of the set of valid subdomains.

7. The non-transitory machine-readable storage medium of claim 6, the operations further comprising:

responsive to receiving a first web resource request at the first common subdomain, wherein the first web resource request identifies a first specific subdomain that has been guessed to be valid, determining that the first specific subdomain is mapped to a first origin subdomain, wherein the first origin subdomain identifies a location for a resource identified in the first web resource request, and forwarding the first web resource request to the first origin subdomain; and responsive to receiving a second web resource request at the second common subdomain, wherein the second web resource request identifies a second specific subdomain that has been guessed to be invalid, determining that the second specific subdomain is not mapped to any origin subdomains, and causing the operations to abort.

8. A method for wildcard-based DNS resolution, implemented by one or more electronic devices, the method comprising:

receiving, from a domain name system (DNS) service attempting to resolve a DNS request that identifies a first subdomain, a request to validate the first subdomain;

based on a probabilistic data structure representing a set of valid subdomains, determining a validation outcome that indicates a guess regarding validity of the first subdomain; and sending, to the DNS service, the validation outcome to cause the DNS service to resolve the first subdomain based on the validation outcome as follows:

on the condition that the validation outcome indicates a guess of the first subdomain being valid, causing the DNS service to resolve, based on a wildcard subdomain DNS record, the first subdomain to a first common subdomain that is reserved for processing subdomains guessed to be valid, and on the condition that the validation outcome indicates a guess of the first subdomain being invalid, causing the DNS service to resolve the first subdomain to a second common subdomain that is reserved for processing subdomains guessed to be invalid in a manner that does not compete with the processing of subdomains guessed to be valid, wherein the protocol to be used to connect to the first and second common subdomains requires more compute resources than the protocol over which the DNS request was sent.

9. The method of claim 8, wherein the protocol over which the DNS request was sent is user datagram protocol (UDP), and wherein the protocol to be used to connect to the first and second common subdomains is transmission control protocol (TCP).

10. The method of claim 8, wherein a first domain is identified in the first subdomain, the first common subdomain, the second common subdomain, and each of the set of valid subdomains.

11. The method of claim 8, the method further comprising:

in response to a request to add a valid subdomain, causing the valid subdomain to be encoded in the probabilistic data structure.

12. The method of claim 11, wherein the request to add a valid subdomain is received via a user interface that is provided to an administrator for a provider of the set of valid subdomains.

13. The method of claim 8, wherein the method is performed by a provider of the set of valid subdomains, and wherein the first and second common subdomains are implemented by the provider of the set of valid subdomains.

14. The method of claim 13, the method further comprising:

responsive to receiving a first web resource request at the first common subdomain, wherein the first web resource request identifies a first specific subdomain that has been guessed to be valid, determining that the first specific subdomain is mapped to a first origin subdomain, wherein the first origin subdomain identifies a location for a resource identified in the first web resource request, and forwarding the first web resource request to the first origin subdomain; and responsive to receiving a second web resource request at the second common subdomain, wherein the second web resource request identifies a second specific subdomain that has been guessed to be invalid, determining that the second specific subdomain is not mapped to any origin subdomains, and causing the method to abort.

15. A set of one or more electronic devices configured for wildcard-based DNS resolution, implemented by a set of one or more electronic devices, the set of electronic devices comprising:

a set of one or more processors; and a set of one or more non-transitory machine-readable storage mediums that provide instructions that, if executed by the set of processors, are configurable to cause the set of electronic devices to perform operations comprising:

receiving, from a domain name system (DNS) service attempting to resolve a DNS request that identifies a first subdomain, a request to validate the first subdomain;

based on a probabilistic data structure representing a set of valid subdomains, determining a validation outcome that indicates a guess regarding validity of the first subdomain; and sending, to the DNS service, the validation outcome to cause the DNS service to resolve the first subdomain based on the validation outcome as follows:

on the condition that the validation outcome indicates a guess of the first subdomain being valid, causing the DNS service to resolve, based on a wildcard subdomain DNS record, the first subdomain to a first common subdomain that is reserved for processing subdomains guessed to be valid, and on the condition that the validation outcome indicates a guess of the first subdomain being invalid, causing the DNS service to resolve the first subdomain to a second common subdomain that is reserved for processing subdomains guessed to be invalid in a manner that does not compete with the processing of subdomains guessed to be valid, wherein the protocol to be used to connect to the first and second common subdomains requires more compute resources than the protocol over which the DNS request was sent.

16. The set of electronic devices of claim 15, wherein the protocol over which the DNS request was sent is user datagram protocol (UDP), and wherein the protocol to be used to connect to the first and second common subdomains is transmission control protocol (TCP).

17. The set of electronic devices of claim 15, wherein a first domain is identified in the first subdomain, the first common subdomain, the second common subdomain, and each of the set of valid subdomains.

18. The set of electronic devices of claim 15, the operations further comprising:

in response to a request to add a valid subdomain, causing the valid subdomain to be encoded in the probabilistic data structure.

19. The set of electronic devices of claim 18, wherein the request to add a valid subdomain is received via a user interface that is provided to an administrator for a provider of the set of valid subdomains.

20. The set of electronic devices of claim 15, wherein the operations are performed by a provider of the set of valid subdomains, and wherein the first and second common subdomains are implemented by the provider of the set of valid subdomains.

21. The set of electronic devices of claim 20, the operations further comprising:

responsive to receiving a first web resource request at the first common subdomain, wherein the first web resource request identifies a first specific subdomain that has been guessed to be valid, determining that the first specific subdomain is mapped to a first origin subdomain, wherein the first origin subdomain identifies a location for a resource identified in the first web resource request, and forwarding the first web resource request to the first origin subdomain; and responsive to receiving a second web resource request at the second common subdomain, wherein the second web resource request identifies a second specific subdomain that has been guessed to be invalid, determining that the second specific subdomain is not mapped to any origin subdomains, and causing the operations to abort.

* * * * *